F. CHANTRELL.
BELT FASTENER.
APPLICATION FILED FEB. 14, 1919.
1,330,239.
Patented Feb. 10, 1920.
Fig. 1
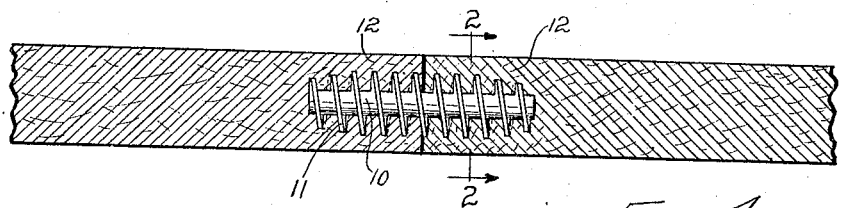
Fig. 4
Fig. 2
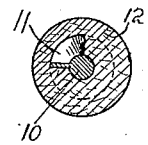
Fig. 3
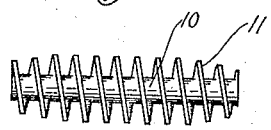
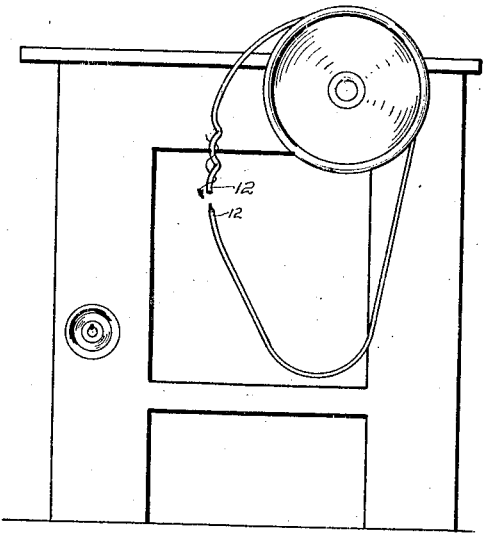
INVENTOR
Felix Chantrell
BY
A. M. Wooster
ATTORNEY

UNITED STATES PATENT OFFICE.

FELIX CHANTRELL, OF BROOKLYN, NEW YORK.

BELT-FASTENER.

1,330,239.  Specification of Letters Patent.  Patented Feb. 10, 1920.

Application filed February 14, 1919. Serial No. 276,916.

*To all whom it may concern:*

Be it known that I, FELIX CHANTRELL, a citizen of the United States, residing at 425 Marlborough road, Brooklyn, New York, county of Kings, State of New York, have invented an Improvement in Belt-Fasteners, of which the following is a specification.

This invention has for its object to provide a fastener for the ends of round, V-shape and narrow flat belts which will join the ends securely and without any appreciable break, will be invisible, and will run smoothly over relatively small pulleys.

With these and other objects in view I have devised the novel belt fastener which I will now describe, referring to the accompanying drawing forming a part of this specification.

Figure 1 is a longitudinal sectional view showing the ends of a round belt connected by means of my novel fastener;

Fig. 2 a section on the line 2—2 in Fig. 1, looking in the direction of the arrows;

Fig. 3 an elevation of the fastener detached, and

Fig. 4 is a view illustrating the mode of connecting the ends of a belt.

My novel fastener comprises a body 10 having a spiral thread 11 extending continuously from end to end thereof. This thread is required to be of special construction in order to take secure hold upon the material of the belt and without removal of an appreciable amount of the material of the belt. The thread must be relatively high and very thin with a relatively wide space between the convolutions of the thread and extending to the bottom thereof, the bottom of the thread being flat. I have shown a thread approximating in height the diameter of the body. The ends of the body may be blunt, as shown, or gimlet pointed, if preferred. I have found in practice that my novel fastener works admirably if the ends are left blunt, as shown, and the full height of the thread extended nearly to the ends. As shown in the drawing, the last two convolutions of the thread are slightly reduced in diameter for convenience in starting the thread into the ends of the belt.

In practice I use in connection with my novel fastener a drilling tool corresponding approximately with the fastener itself. This tool, not shown, is gimlet pointed and drills a hole in the ends of the belt corresponding with the body of the fastener and is provided with a thread which forms in the material of the belt a spiral path for the thread of the fastener.

In connecting the ends of a belt indicated by 12, one end of the fastener is dipped in glue or liquid cement and is then turned into one end of the belt. The belt may then be passed over the larger of the two pulleys upon which it is to be used, as in Fig. 4. The exposed end of the fastener is then dipped in glue or liquid cement, the free end of the belt is twisted backward approximately as many turns as there are convolutions of thread exposed, and is then turned forward to place on the fastener. Before turning the second end of the belt to place both ends of the belt are covered with the glue or cement and in finishing the operation the ends of the belt are caused to abut firmly and then any superfluous glue or cement is wiped off. I find in practice that a belt having its ends connected in this manner may be put into use at once without danger of the ends separating. The special shape of the thread and its great height relatively to the diameter of the body give such a firm hold upon the material of the belt that the belt is ordinarily stronger at the fastening than elsewhere and is more likely to break than to have its ends separate. The special construction of thread moreover enables me to make the body so short relatively as not to interfere appreciably with the smooth running of the belt, the joint, as a matter of fact passing over the smaller pulley without the slightest shock or click.

Having thus described my invention, I claim:

An invisible fastener for the ends of belts comprising a cylindrical body of approximately uniform diameter and blunt ends, said body being provided with an external flat relatively high and thin thread the convolutions of which are widely separated to engage correspondingly contoured holes formed in the ends of the belt, the last two convolutions at each end being reduced in diameter.

In testimony whereof I affix my signature.

FELIX CHANTRELL.